US010655397B2

(12) United States Patent
Cook, III et al.

(10) Patent No.: US 10,655,397 B2
(45) Date of Patent: May 19, 2020

(54) MECHANICAL-INTERLOCKING REINFORCING PARTICLES FOR USE IN METAL MATRIX COMPOSITE TOOLS

(71) Applicant: Halliburton Energy Services, Inc., Houston, TX (US)

(72) Inventors: Grant O. Cook, III, Spring, TX (US); Daniel Brendan Voglewede, Spring, TX (US); Garrett T. Olsen, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 439 days.

(21) Appl. No.: 15/113,586

(22) PCT Filed: Sep. 22, 2015

(86) PCT No.: PCT/US2015/051476
§ 371 (c)(1),
(2) Date: Jul. 22, 2016

(87) PCT Pub. No.: WO2017/052512
PCT Pub. Date: Mar. 30, 2017

(65) Prior Publication Data
US 2017/0234076 A1  Aug. 17, 2017

(51) Int. Cl.
*E21B 10/54* (2006.01)
*B22F 7/00* (2006.01)
(Continued)

(52) U.S. Cl.
CPC ................ *E21B 10/54* (2013.01); *B22C 9/22* (2013.01); *B22D 23/06* (2013.01); *B22D 25/02* (2013.01); *B22F 7/00* (2013.01); *B33Y 10/00* (2014.12); *B33Y 80/00* (2014.12); *C22C 1/0491* (2013.01); *C22C 1/1094* (2013.01); *C22C 26/00* (2013.01); *C22C 29/00* (2013.01); *C23F 1/16* (2013.01); *E21B 10/602* (2013.01); *B22F 3/1055* (2013.01); *B22F 2005/001* (2013.01);
(Continued)

(58) Field of Classification Search
CPC .... E21B 10/54; E21B 10/602; E21B 17/1085; B33Y 10/00; B33Y 80/00; B22C 9/22; B22D 25/02; B22D 23/06; C23F 1/16; B22F 3/26; B22F 7/06; B22F 2005/001; C22C 26/00; C22C 29/08; C09K 3/1427
See application file for complete search history.

(56) References Cited

U.S. PATENT DOCUMENTS 6,478,887 B1  11/2002  Sue et al.
7,261,752 B2   8/2007  Sung
(Continued)

FOREIGN PATENT DOCUMENTS

WO    2012058410 A2    10/2011

OTHER PUBLICATIONS

ISR/WO for PCT/US2015/051476 dated Jun. 21, 2016.

*Primary Examiner* — Yong-Suk Ro
(74) *Attorney, Agent, or Firm* — Alan Bryson; C. Turney Law Group PLLC

(57) ABSTRACT

A metal matrix composite tool includes a body having hard composite portion that includes reinforcing particles dispersed in a binder material. At least some of the reinforcing particles comprise a monolithic particle structure including a core having irregular outer surface features integral with the core.

13 Claims, 6 Drawing Sheets

(51) Int. Cl.
| | |
|---|---|
| *C22C 1/10* | (2006.01) |
| *C22C 26/00* | (2006.01) |
| *C22C 1/04* | (2006.01) |
| *C22C 29/00* | (2006.01) |
| *B33Y 10/00* | (2015.01) |
| *B33Y 80/00* | (2015.01) |
| *B22C 9/22* | (2006.01) |
| *B22D 23/06* | (2006.01) |
| *B22D 25/02* | (2006.01) |
| *C23F 1/16* | (2006.01) |
| *E21B 10/60* | (2006.01) |
| *B22F 5/00* | (2006.01) |
| *B22F 3/105* | (2006.01) |

(52) U.S. Cl.
CPC ....... *B22F 2207/07* (2013.01); *B22F 2999/00* (2013.01); *C22C 1/1036* (2013.01); *C22C 2202/02* (2013.01); *Y02P 10/295* (2015.11)

(56) References Cited

U.S. PATENT DOCUMENTS

| | | |
|---|---|---|
| 8,220,567 B2 | 7/2012 | Scott et al. |
| 8,927,101 B2 | 1/2015 | Dumm et al. |
| 8,936,114 B2 | 1/2015 | Thomas et al. |
| 2002/0084111 A1* | 7/2002 | Evans .................... C22C 29/08 175/374 |
| 2009/0277839 A1 | 11/2009 | Linford |
| 2009/0283335 A1 | 11/2009 | Lockwood et al. |
| 2013/0180786 A1* | 7/2013 | Thomas .............. E21B 17/1085 175/434 |

* cited by examiner

MECHANICAL-INTERLOCKING REINFORCING PARTICLES FOR USE IN METAL MATRIX COMPOSITE TOOLS

BACKGROUND

A wide variety of tools are used in the oil and gas industry for forming wellbores, in completing drilled wellbores, and in producing hydrocarbons such as oil and gas from completed wells. Examples of these tools include cutting tools, such as drill bits, reamers, stabilizers, and coring bits; drilling tools, such as rotary steerable devices and mud motors; and other tools, such as window mills, tool joints, and other wear-prone tools. These tools, and several other types of tools outside the realm of the oil and gas industry, are often formed as metal matrix composites (MMCs), and referred to herein as "MMC tools."

An MMC tool is typically manufactured by infiltrating a powder matrix reinforcement material with a binder material, such as a metallic alloy, which provided a more solid resulting structure. More particularly, manufacturing an MMC tool includes depositing matrix reinforcement material into a mold designed to form various external and internal features of the MMC tool. Interior surfaces of the mold cavity, for example, may be shaped to form desired external features of the MMC tool, and temporary displacement materials, such as consolidated sand or graphite, may be positioned within interior portions of the mold cavity to form various internal (or external) features of the MMC tool. Following the infiltration process, the temporary displacement materials may be removed from the mold. A quantity of the binder material is then added to the mold cavity and the mold is then placed within a furnace and the temperature of the mold is increased to a temperature that liquefies the binder material and thereby allows the binder to infiltrate interstitial spaces between reinforcing particles of the matrix reinforcement material.

While MMC drill bits are generally erosion-resistant and exhibit high impact strength, drilling operations cause outer surfaces of MMC drill bits to gradually wear and erode through continued abrasive contact with the underlying subterranean formations. With typical matrix materials, once a critical erosion depth for a reinforcing particle is reached, impact events associated with drilling cause the reinforcing particle to be dislodged (i.e., extracted) from its location within the softer binder material. Since reinforcing particles are typically harder and more erosion-resistant than binder materials, it may be advantageous to enhance the bonding between the reinforcing particles and the binder material to provide a more cohesive MMC material and thereby reduce the propensity for reinforcing particles to be dislodged from the binder material.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
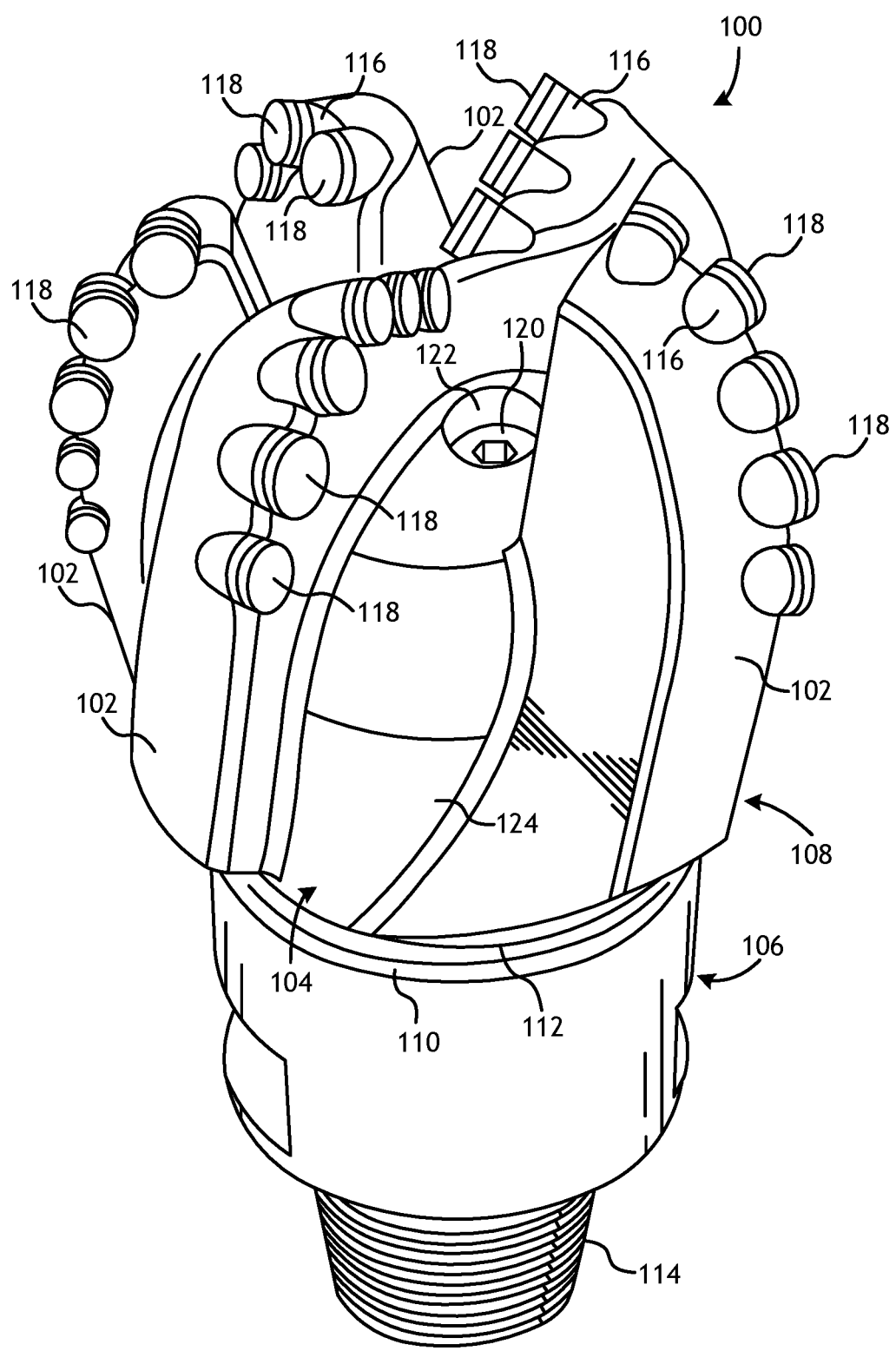
FIG. 1 is a perspective view of an exemplary drill bit that can incorporate the principles of the present disclosure.

The present disclosure relates to tool manufacturing and, more particularly, to metal matrix composite tools reinforced with mechanical interlocking reinforcing particles that provide irregular outer surface features.

Embodiments of the present disclosure describe reinforcing particles that have an inner core and irregular outer surface features provided on the inner core. Conventional reinforcing particles have both an inner core and an outer shell separately formed or deposited on the outer surfaces of the inner core. By contrast, the presently described reinforcing particles may avoid the need to apply an outer shell on the inner core. More particularly, the presently described reinforcing particles may be monolithic structures, each including an inner portion serving as the core and outer surface features that are formed from with the core. In other words, the outer surface features constitute and otherwise form an integral structural characteristic of the core and its material construct. As a result, there is no interface between the core and the outer surface features in the presently described reinforcing particles.

In some embodiments, the outer surface features of the presently disclosed reinforcing particles may be irregular outer surface features that mechanically interlock with a binder material and neighboring reinforcing particles during an infiltration process, and may be referred to accordingly as interlocking surface features. The irregular shapes of the interlocking surface features increase the retention and pull-out strength of the reinforcing particles, which may help prevent premature extraction of the reinforcing materials out of the binder material while experiencing impact events that cause erosion.

Embodiments of the present disclosure are applicable to any tool or part formed as a metal matrix composite (MMC). For instance, the principles of the present disclosure may be applied to the fabrication of tools or parts commonly used in the oil and gas industry for the exploration and recovery of hydrocarbons. Such tools and parts include, but are not limited to, oilfield drill bits or cutting tools (e.g., fixed-angle drill bits, roller-cone drill bits, coring drill bits, bi-center drill bits, impregnated drill bits, reamers, stabilizers, hole openers, cutters), non-retrievable drilling components, aluminum drill bit bodies associated with casing drilling of wellbores, drill-string stabilizers, cones for roller-cone drill bits, models for forging dies used to fabricate support arms for roller-cone drill bits, arms for fixed reamers, arms for expandable reamers, internal components associated with expandable reamers, sleeves attached to an uphole end of a rotary drill bit, rotary steering tools, logging-while-drilling tools, measurement-while-drilling tools, side-wall coring tools, fishing spears, washover tools, rotors, stators and/or housings for downhole drilling motors, blades and housings for downhole turbines, and other downhole tools having complex configurations and/or asymmetric geometries associated with forming a wellbore.

It will be appreciated, however, that the principles of the present disclosure may be equally be formed as an MMC. For instance, the methods described herein may be applied to fabricating armor plating, automotive components (e.g., sleeves, cylinder liners, driveshafts, exhaust valves, brake rotors), bicycle frames, brake fins, wear pads, aerospace components (e.g., landing-gear components, structural tubes, struts, shafts, links, ducts, waveguides, guide vanes, rotor-blade sleeves, ventral fins, actuators, exhaust structures, cases, frames, fuel nozzles), turbopump components, a screen, a filter, and a porous catalyst, without departing from the scope of the disclosure. Those skilled in the art will readily appreciate that the foregoing list is not a comprehensive listing, but only exemplary. Accordingly, the foregoing listing of parts and/or components should not be limiting to the scope of the present disclosure.

Referring to FIG. 1, illustrated is a perspective view of an example MMC tool 100 that may be fabricated in accordance with the principles of the present disclosure. The MMC tool 100 is generally depicted in FIG. 1 as a fixed-cutter drill bit that may be used in the oil and gas industry to drill wellbores. Accordingly, the MMC tool 100 will be referred to herein as the "drill bit 100," but, as indicated above, the drill bit 100 may alternatively be replaced with any type of MMC tool or part used in the oil and gas industry or any other industry, without departing from the scope of the disclosure.

As illustrated in FIG. 1, the drill bit 100 may include or otherwise define a plurality of cutter blades 102 arranged along the circumference of a bit head 104. The bit head 104 is connected to a shank 106 to form a bit body 108. The shank 106 may be connected to the bit head 104 by welding, such as using laser arc welding, which results in the formation of a weld 110 formed within a weld groove 112. The shank 106 may further include or otherwise be connected to a threaded pin 114, such as an American Petroleum Institute (API) drill pipe thread.

In the illustrated example, the drill bit 100 includes five cutter blades 102, in which multiple recesses or pockets 116 are formed. A cutting element 118 may be fixedly installed within each recess 116. This can be done, for example, by brazing each cutting element 118 into a corresponding recess 116. As the drill bit 100 is rotated in use, the cutting elements 118 engage the rock and underlying earthen materials, to dig, scrape or grind away the material of the formation being penetrated.

During drilling operations, drilling fluid or "mud" can be pumped downhole through a drill string (not shown) coupled to the drill bit 100 at the threaded pin 114. The drilling fluid circulates through and out of the drill bit 100 at one or more nozzles 120 positioned in nozzle openings 122 defined in the bit head 104. Junk slots 124 are formed between each adjacent pair of cutter blades 102. Cuttings, downhole debris, formation fluids, drilling fluid, etc., may pass through the junk slots 124 and circulate back to the well surface within an annulus formed between exterior portions of the drill string and the inner wall of the wellbore being drilled.

Figure 2:
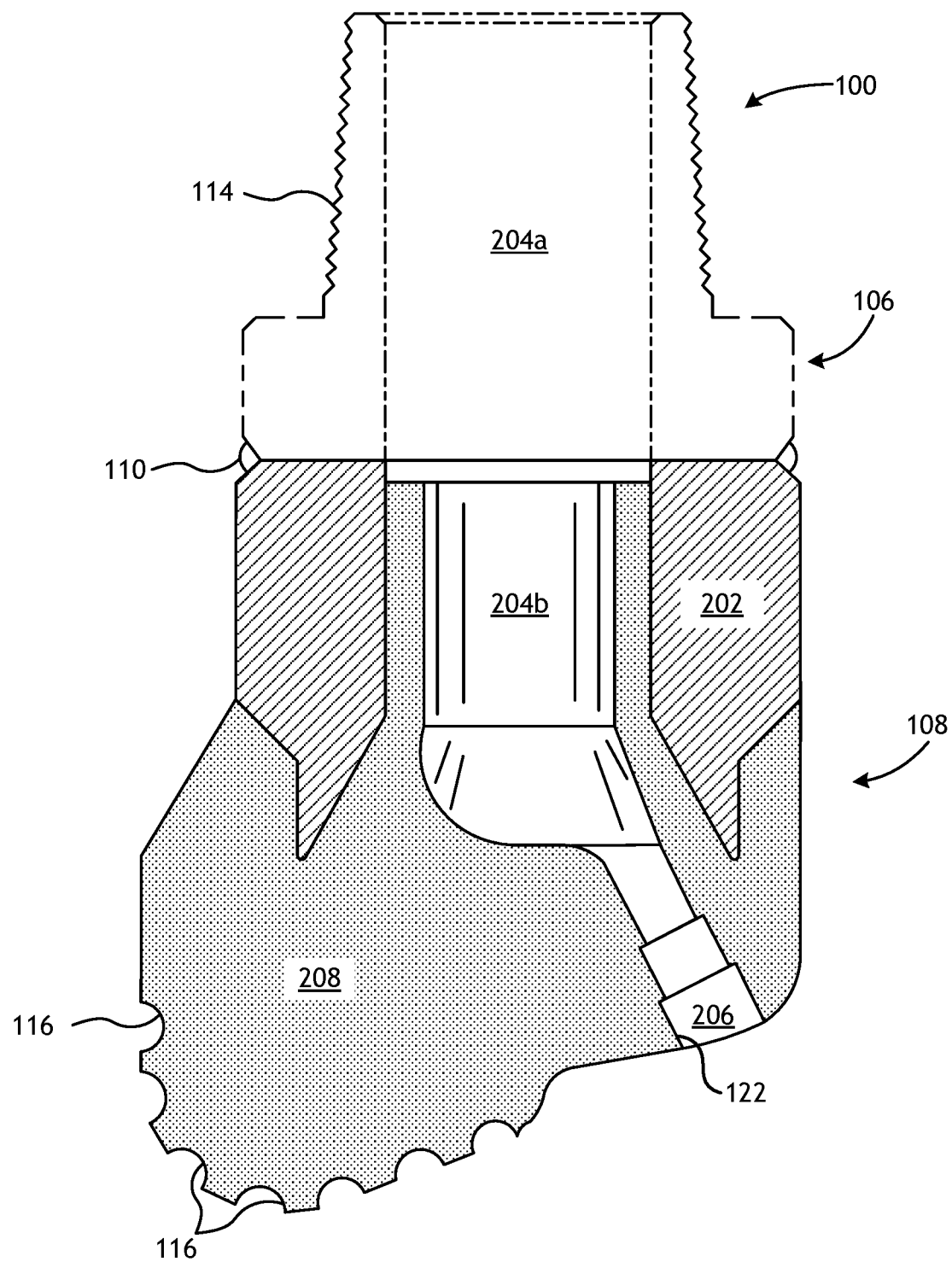
FIG. 2 is a cross-sectional view of the drill bit of FIG. 1.

FIG. 2 is a cross-sectional side view of the drill bit 100 of FIG. 1.

Similar numerals from FIG. 1 that are used in FIG. 2 refer to similar components that are not described again. As illustrated, the shank 106 may be securely attached to a metal blank (or mandrel) 202 at the weld 110 and the metal blank 202 extends into the bit body 108. The shank 106 and the metal blank 202 are generally cylindrical structures that define corresponding fluid cavities 204a and 204b, respectively, in fluid communication with each other. The fluid cavity 204b of the metal blank 202 may extend longitudinally into the bit body 108. At least one flow passageway 206 (one shown) may extend from the fluid cavity 204b to exterior portions of the bit body 108. The nozzle openings 122 (one shown in FIG. 2) may be defined at the ends of the flow passageways 206 at the exterior portions of the bit body 108. The pockets 116 are formed in the bit body 108 and are shaped or otherwise configured to receive the cutting elements 118 (FIG. 1). In accordance with the teachings of the present disclosure, and as described in more detail below, the bit body 108 may comprise a hard composite portion 208 consisting of a matrix reinforced with mechanical interlocking reinforcing particles that provide irregular outer surface features.

Figure 3:
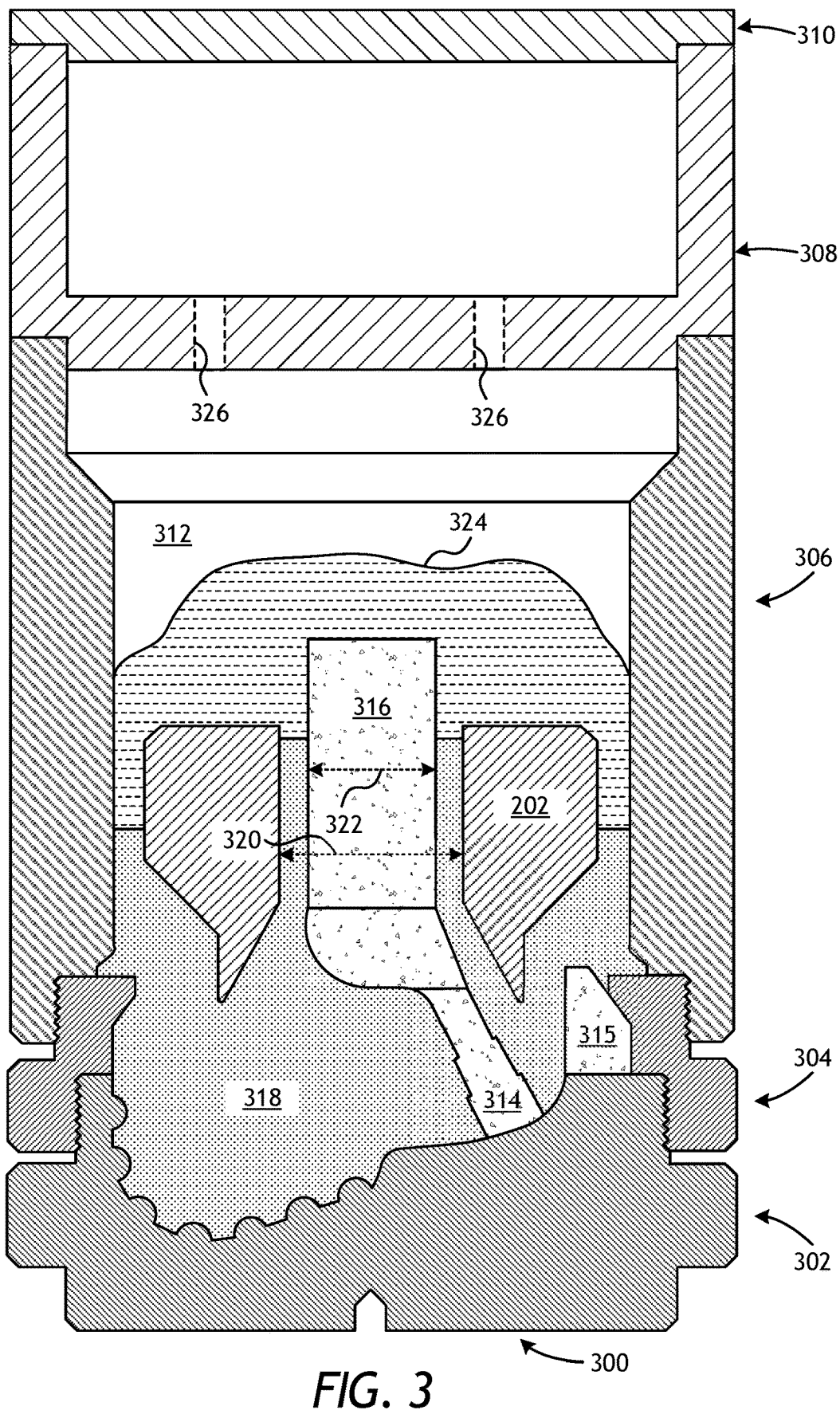
FIG. 3 is a cross-sectional side view of an exemplary mold assembly for use in forming the drill bit of FIG. 1.

FIG. 3 is a cross-sectional side view of a mold assembly 300 that may be used to form the drill bit 100 of FIGS. 1 and 2. While the mold assembly 300 is shown and discussed as being used to help fabricate the drill bit 100, those skilled in the art will readily appreciate that varying configurations of the mold assembly 300 may be used in fabricating any of the MMC tools and parts mentioned herein, without departing from the scope of the disclosure. As illustrated, the mold assembly 300 may include several components such as a mold 302, a gauge ring 304, and a funnel 306. In some embodiments, the funnel 306 may be operatively coupled to the mold 302 via the gauge ring 304, such as by corresponding threaded engagements, as illustrated. In other embodiments, the gauge ring 304 may be omitted from the mold assembly 300 and the funnel 306 may instead be operatively coupled directly to the mold 302, such as via a corresponding threaded engagement, without departing from the scope of the disclosure.

In some embodiments, as illustrated, the mold assembly 300 may further include a binder bowl 308 and a cap 310 placed above the funnel 306. The mold 302, the gauge ring 304, the funnel 306, the binder bowl 308, and the cap 310 may each be made of or otherwise comprise graphite or alumina ($Al_2O_3$), for example, or other suitable materials. An infiltration chamber 312 may be defined or otherwise provided within the mold assembly 300. Various techniques may be used to manufacture the mold assembly 300 and its components, such as machining graphite blanks to produce the various components and thereby define the infiltration chamber 312 to exhibit a negative or reverse profile of desired exterior features of the drill bit 100 (FIGS. 1 and 2).

Materials, such as consolidated sand or graphite, may be positioned within the mold assembly 300 at desired locations to form various features of the drill bit 100 (FIGS. 1 and 2). For example, one or more nozzle displacements or legs 314 (one shown) may be positioned to correspond with desired locations and configurations of the flow passageways 206 (FIG. 2) and their respective nozzle openings 122 (FIGS. 1 and 2). One or more junk slot displacements 315 may also be positioned within the mold assembly 300 to correspond with the junk slots 124 (FIG. 1). Moreover, a cylindrically-shaped central displacement 316 may be placed on the legs 314. The number of legs 314 extending from the central displacement 316 will depend upon the desired number of flow passageways and corresponding nozzle openings 122 in the drill bit 100. Further, cutter-pocket displacements (shown as part of mold 302 in FIG. 3) may be placed in the mold 302 to form cutter pockets 116.

After the desired materials, including the central displacement 316 and the legs 314, have been installed within the mold assembly 300, reinforcement materials 318 may then be placed within or otherwise introduced into the mold assembly 300. The reinforcement materials 318 may include various types and sizes of reinforcing particles. According to the present disclosure, and as described in greater detail below, some or all of the reinforcing particles of the reinforcement materials 318 may comprise a monolithic particle structure made up of a solid inner core having irregular or variable outer surface features. In contrast to conventional reinforcing particles, which have both an inner core and an outer shell separately formed or deposited on the outer surfaces of an inner core, the core and the outer surface features of the presently described reinforcing particles may comprise monolithic structures made from the same monolithic material. In other words, the reinforcing particles of the present disclosure include an inner portion serving as the core and outer surface features that are unitarily formed with the core such that the outer surface features constitute and otherwise form integral structural characteristics of the core and its material construct. As a result, there may be no defined or clear interface between the core and the outer surface features in the presently described reinforcing particles. Rather, the material of the core may transition radially to the outer surface features, where such a transition may include functional grading of chemistry and/or composition resulting from the creation of the irregular outer surface features (e.g., from a diffusion-based step), such as in the case hardening of steels where the reinforcing particle may exhibit an identifiable carbon diffusion depth. This is in contrast to some multi-material particles with specific surface features, wherein the transition between the core and the outer material with accompanying surface features may be characterized as a distinct material construct produced by combining, joining, bonding, etc. the core and the outer materials. As discussed herein, such reinforcing particles may prove advantageous in strengthening the bit body 108 (FIGS. 1 and 2) and, more particularly, the hard composite portion 208 (FIG. 2) thereof.

Suitable reinforcing particles include, but are not limited to, particles of metals, metal alloys, superalloys, intermetallics, borides, carbides, nitrides, oxides, ceramics, diamonds, and the like, or any combination thereof. Examples of reinforcing particles suitable for use in conjunction with the embodiments described herein may include particles that include, but are not limited to, tungsten, molybdenum, niobium, tantalum, rhenium, iridium, ruthenium, beryllium, titanium, chromium, rhodium, iron, cobalt, uranium, nickel, nitrides, silicon nitrides, boron nitrides, cubic boron nitrides, natural diamonds, synthetic diamonds, cemented carbide, spherical carbides, low-alloy sintered materials, cast carbides, silicon carbides, boron carbides, cubic boron carbides, molybdenum carbides, titanium carbides, tantalum carbides, niobium carbides, chromium carbides, vanadium carbides, iron carbides, tungsten carbides, macrocrystalline tungsten carbides, cast tungsten carbides, crushed sintered tungsten carbides, carburized tungsten carbides, steels, stainless steels, austenitic steels, ferritic steels, martensitic steels, precipitation-hardening steels, duplex stainless steels, ceramics, iron alloys, nickel alloys, cobalt alloys, chromium alloys, HASTELLOY® alloys (i.e., nickel-chromium containing alloys, available from Haynes International), INCONEL® alloys (i.e., austenitic nickel-chromium containing superalloys available from Special Metals Corporation), WASPALOYS® (i.e., austenitic nickel-based superalloys), RENE® alloys (i.e., nickel-chromium containing alloys available from Altemp Alloys, Inc.), HAYNES® alloys (i.e., nickel-chromium containing superalloys available from Haynes International), INCOLOY® alloys (i.e., iron-nickel containing superalloys available from Mega Mex), MP98T (i.e., a nickel-copper-chromium superalloy available from SPS Technologies), TMS alloys, CMSX® alloys (i.e., nickel-based superalloys available from C-M Group), cobalt alloy 6B (i.e., cobalt-based superalloy available from HPA), N-155 alloys, any mixture thereof, and any combination thereof.

The reinforcing particles described herein may exhibit a size and general diameter ranging from a lower limit of 25 microns or 50 microns or 100 microns or 250 microns to an upper limit of 500 microns or 1000 microns or 2500 microns or 5000 microns, wherein the diameter of the reinforcing particles may range from any lower limit to any upper limit and encompasses any subset therebetween. In some embodiments, especially in cases where the reinforcing particles described herein are fabricated via additive manufacturing techniques, the size and general diameter of some of the reinforcing particles can be larger than 1000 microns, such as about 2500 microns or 5000 microns in diameter.

The metal blank 202 may be supported at least partially by the reinforcement materials 318 within the infiltration chamber 312. More particularly, after a sufficient volume of the reinforcement materials 318 has been added to the mold assembly 300, the metal blank 202 may then be placed within mold assembly 300. The metal blank 202 may include an inside diameter 320 that is greater than an outside diameter 322 of the central displacement 316, and various fixtures (not expressly shown) may be used to position the metal blank 202 within the mold assembly 300 at a desired location. The reinforcement materials 318 may then be filled to a desired level within the infiltration chamber 312.

Binder material 324 may then be placed on top of the reinforcement materials 318, the metal blank 202, and the core 316. Suitable binder materials 324 include, but are not limited to, copper, nickel, cobalt, iron, aluminum, molybdenum, chromium, manganese, tin, zinc, lead, silicon, tungsten, boron, phosphorous, gold, silver, palladium, indium, any mixture thereof, any alloy thereof, and any combination thereof. Non-limiting examples of the binder material 324 may include copper-phosphorus, copper-phosphorous-silver, copper-manganese-phosphorous, copper-nickel, copper-manganese-nickel, copper-manganese-zinc, copper-manganese-nickel-zinc, copper-nickel-indium, copper-tin-manganese-nickel, copper-tin-manganese-nickel-iron, gold-nickel, gold-palladium-nickel, gold-copper-nickel, silver-copper-zinc-nickel, silver-manganese, silver-copper-zinc-cadmium, silver-copper-tin, cobalt-silicon-chromium-nickel-tungsten, cobalt-silicon-chromium-nickel-tungsten-boron, manganese-nickel-cobalt-boron, nickel-silicon-chromium, nickel-chromium-silicon-manganese, nickel-chromium-silicon, nickel-silicon-boron, nickel-silicon-chromium-boron-iron, nickel-phosphorus, nickel-manganese, copper-aluminum, copper-aluminum-nickel, copper-aluminum-nickel-iron, copper-aluminum-nickel-zinc-tin-iron, and the like, and any combination thereof. Examples of commercially-available binder materials 324 include, but are not limited to, VIRGIN™ Binder 453D (copper-manganese-nickel-zinc, available from Belmont Metals, Inc.), and copper-tin-manganese-nickel and copper-tin-manganese-nickel-iron grades 516, 519, 523, 512, 518, and 520 available from ATI Firth Sterling.

In some embodiments, the binder material 324 may be covered with a flux layer (not expressly shown). The amount of binder material 324 (and optional flux material) added to the infiltration chamber 312 should be at least enough to infiltrate the reinforcement materials 318 during the infiltration process. In some instances, some or all of the binder material 324 may be placed in the binder bowl 308, which may be used to distribute the binder material 324 into the infiltration chamber 312 via various conduits 326 that extend therethrough. The cap 310 (if used) may then be placed over the mold assembly 300. The mold assembly 300 and the materials disposed therein may then be preheated and then placed in a furnace (not shown). When the furnace temperature reaches the melting point of the binder material 324, the binder material 324 will liquefy and proceed to infiltrate the reinforcement materials 318.

After a predetermined amount of time allotted for the liquefied binder material 324 to infiltrate the reinforcement materials 318, the mold assembly 300 may then be removed from the furnace and cooled at a controlled rate. Once cooled, the mold assembly 300 may be broken away to expose the bit body 108 (FIGS. 1 and 2) that includes the hard composite portion 208 (FIG. 2). Subsequent processing according to well-known techniques may be used to finish the drill bit 100 (FIG. 1).

According to embodiments of the present disclosure, some or all of the reinforcing particles of the reinforcement materials 318 may comprise a monolithic particle structure with each particle comprising a solid core having irregular outer surface features integrally formed therewith. As used herein, the term "irregular" as applied to the outer surface features of the reinforcing particles refers to variable features that deviate from the typical surface shape of the baseline reinforcing particle and can include any positive or negative surface feature that departs from a smooth or even exterior surface. Positive outer surface features include any feature that extends outward or away from the core of the reinforcing particle. Example positive outer surface features that may be characterized as "irregular" include, but are not limited to, protrusions, projections, bumps, protuberances, ribs, fins, knobs, hooks, hitches, mesas, cylinders, cones, truncated cones, truncated cones on top of cylindrical bases, cones extending from cylindrical bases, two or more stacked cylinders of decreasing diameter, flanges, I-beam portions, bolt shapes with a tapered or flat head, and any other outwardly extending feature. In contrast, negative outer surface features include any feature that extends inward into the core, or features that are otherwise defined in the core. Example negative surface features that may be characterized as "irregular" include, but are not limited to, pockets, pits, holes, grooves, cracks, seams, knurling, channels, I-beam-shaped channels, bolt-shaped channels, or any variation defined in the core to provide a porous, semi-porous, or interlocking outer shell or layer.

It should be noted that the afore-mentioned examples of positive and negative outer surface features are provided for illustrative purposes only and, therefore, should not be considered to limit the scope of the present disclosure. Rather, those skilled in the art will readily recognize that several other examples of positive and negative outer surface features that are not particularly mentioned herein could be employed, without departing from the scope of the disclosure.

The irregular outer surface features of the reinforcing particles may prove advantageous in enhancing the bond between the reinforcing particles and the binder material 324, and thereby providing a more cohesive and erosion-resistant hard composite portion 208 (FIG. 2). The enhanced bonding may be achieved through mechanical interlocking of the irregular outer surface features with the material of the surrounding binder material 324 and/or other reinforcing particles. Accordingly, the outer surface features may alternatively be referred to herein as "interlocking" surface features. The enhanced bond due to mechanical interlocking of the irregular outer surface features with the binder material 324 may provide the reinforcing particles with increased adhesion and pullout strength, thereby resulting in a more erosion-resistant hard composite portion 208.

The advantages of the enhanced bonding of the reinforcing particles due to mechanical interlocking can be utilized in addition to (or in place of) chemical interactions and wettability (i.e., surface adhesion) that are typically relied upon to generate strong bonds between the reinforcing particles and the binder material 324. In other words, using the presently described reinforcing particles with common (existing) binder materials 324 should increase the retention capacity of the reinforcing particles, and simultaneously increase the mechanical properties (e.g., erosion resistance, transverse rupture strength) of the resulting hard composite portion 208 (FIG. 2). Alternatively, since the presently described reinforcing particles will exhibit enhanced bonding due to mechanical interlocking, an operator may have the option of changing the binder material 324, perhaps to a cheaper composition that exhibits less wetting on and/or chemical interaction with the reinforcing particles. In such embodiments, the enhanced bonding capability of the reinforcing particles may be relied upon to make up for the difference in adhesion strength lost in using a different (cheaper) binder material 324.

FIGS. 4A-4D depict progressive schematic side views of an exemplary reinforcing particle 402 embedded within the binder material 324. While only one reinforcing particle 402 is shown in FIGS. 4A-4D, the reinforcing particle 402 may comprise part of the plurality of reinforcing particles of the reinforcement material 318 of FIG. 3. Accordingly, the reinforcing particle 402 may be made of any of the materials mentioned herein above. Moreover, the reinforcing particle 402 and the binder material 324 may combine to form a portion of the hard composite portion 208 (FIG. 2).

As illustrated, the reinforcing particle 402 is disposed at or near an outer surface 404 of the binder material 324 or, in other words, at or near an outer surface of the hard composite portion 208 (FIG. 2). The reinforcing particle 402 may include a core 406 and outer surface features 408 disposed about all or a portion of the core 406. In some embodiments, the core 406 may be a solid structure. In other embodiments, however, the core 406 may be porous or semi-porous. Moreover, while depicted as a generally spherical or circular structure, the reinforcing particle 402 may alternatively exhibit any other cross-sectional shape, such as an oval, ellipse, triangle, square, rectangle, parallelogram, trapezoid, quadrilateral, pentagon, hexagon, octagon, regular polygon, irregular polygon, or any combination thereof, with sharp, rounded, or chamfered vertices, without departing from the scope of the disclosure.

The core 406 and the outer surface features 408 may cooperatively define a monolithic particle structure, where the outer surface features 408 provide irregular features that form an integral structural characteristic of the core 406. In other words, the outer surface features 408 are not structural components or features that are subsequently applied to or deposited on the outer surface of the core 406, such as in the conventional case of depositing, bonding, or adhering an outer shell or layer of another material on the outer surface of the reinforcing particle 402. Rather, the outer surface features 408 form integral surface feature extensions or definitions of the core 406. As a result, there may be no defined or clear interface (i.e., transition from one material or layer to the next) between the core 406 and the outer surface features 408.

An integral surface feature extension may comprise a structural characteristic of the core 406 that extends radially outward from the core 406.

In some embodiments, for instance, the material of the core 406 may transition radially to the outer surface features 408 through functional grading of chemistry and/or composition resulting from a diffusion-based step that generates the outer surface features 408. An integral surface feature definition may comprise a structural characteristic of the core 406 that is defined into the body of the core 406. In some embodiments, for instance, the transition between the core 406 and the outer surface features 408 may exhibit an identifiable carbon diffusion depth resulting from a hardening treatment. Various example methods of forming the reinforcing particle 402 will be further described below in connection with FIGS. 5A-5D.

The outer surface features 408 may provide irregular positive and/or negative surface features for the core 406. As described above, such irregular surface features may include, but are not limited to, protrusions, projections, bumps, protuberances, and any other outwardly extending feature, but may also include pockets, pits, holes, grooves, cracks, seams, ribs, fins, knobs, hooks, hitches, mesas, cylinders, cones, truncated cones, truncated cones on top of cylindrical bases, cones extending from cylindrical bases, two or more stacked cylinders of decreasing diameter, flanges, I-beam portions, bolt shapes with a tapered or flat head, or any irregularity defined in the main body of the reinforcing particle 402 that may result in a porous or semi-porous layer defined about the core 406.

Figure 4A:
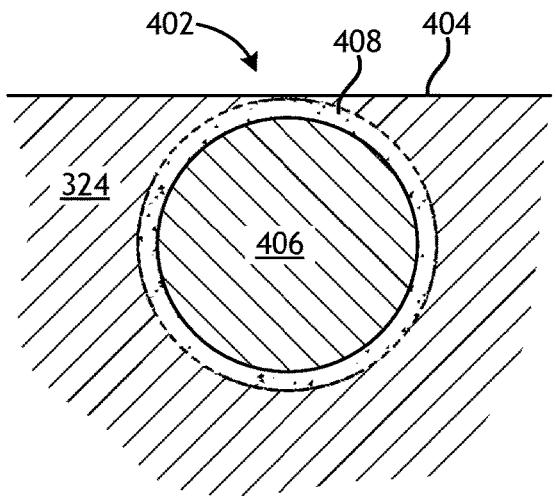
FIGS. 4A-4D depict progressive schematic side views of an exemplary reinforcing particle embedded within binder material.
Figure 4B:
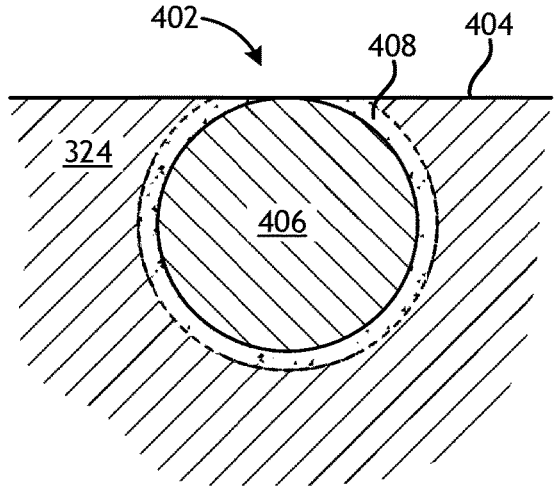
Figure 4C:
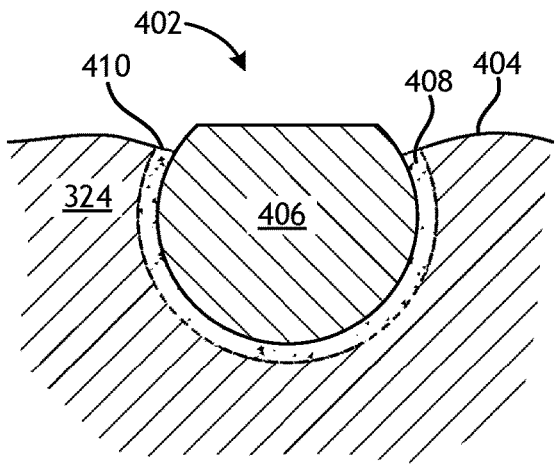
Figure 4D:
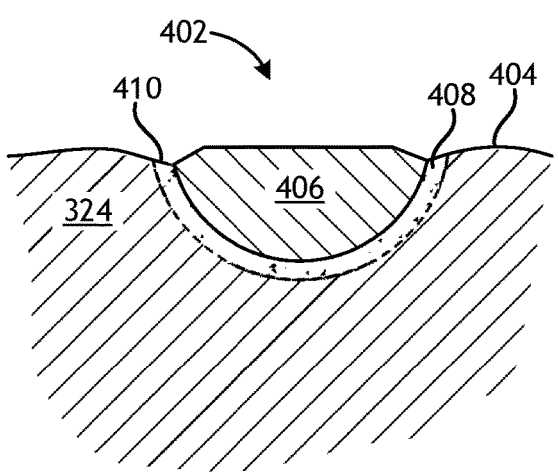

The reinforcing particle 402 is shown in FIGS. 4A-4D in progressive views that depict gradual erosion of the binder material 324 at the outer surface 404. The erosion on the binder material 324 may result from operation of an associated MMC tool (e.g., the drill bit 100 of FIGS. 1 and 2). In FIG. 4A, the erosion of the outer surface 404 has progressed until reaching the outer surface features 408. In FIG. 4B, the erosion of the outer surface 404 has progressed further until a portion of the outer surface features 408 has also been eroded away. In FIG. 4C, the erosion of the outer surface 404 has progressed even further to expose a greater portion of the reinforcing particle 402 and simultaneously erode exposed portions of the outer surface features 408 from the core 406.

Since the binder material 324 is generally made of a softer material than the material of the reinforcing particle 402, the binder material 324 will erode at a faster rate and may thereby create dips or grooves 410 around the harder reinforcing particle 402. The irregularity or variation in the outer surface features 408 may result in a decrease of erosion resistance for the reinforcing particle 402 when it is positioned immediately at the outer surface 404. This is because the irregularly shaped material of the outer surface features 408 will be more prone to erode at a faster rate as compared to the solid core 406. This can be seen in FIG. 4C, where the outer surface features 408 have eroded away preferentially compared to the core 406, which remains substantially intact since it is able to resist erosion at a higher rate as compared to the outer surface features 408.

The irregular or variable features of the outer surface features 408, however, may prove advantageous when the binder material 324 surrounding the reinforcing particle 402 erodes to a point where a large portion of the reinforcing particle 402 becomes exposed and/or partly eroded. This can be seen in FIG. 4D, where a large portion of the reinforcing particle 402 is exposed and some of the material of the core 406 has eroded away along with the exposed portions of the outer surface features 408. In such scenarios, the irregular or variable features of the outer surface features 408 that are still bonded to or interlocked with the underlying binder material 324 may provide increased retention and pull-out strength and thereby help prevent the remaining portions of the reinforcing particle 402 from being prematurely extracted out of the binder material 324 while experiencing impact events that cause erosion.

In some embodiments, the reinforcing particle 402 embedded within the binder material 324 may interlock and otherwise bond with neighboring reinforcing particles 402 in forming the hard composite portion 208 (FIG. 2). Such mutual mechanical interlocking between adjacent reinforcing particles 402 may prove advantageous in helping to maintain the reinforcing particles 402 coupled to the hard composite portion 208 in the event the binder material 324 holding them together is removed by erosion. In such embodiments, the loss of the reinforcing particles 402 due to erosion of the binder material 324 may be significantly delayed.

FIGS. 5A-5D depict views of exemplary reinforcing particles 502, shown as reinforcing particles 502a, 502b, 502c, and 502d, according to embodiments of the present disclosure. The reinforcing particles 502a-d may be the same as or similar to the reinforcing particle 402 of FIGS. 4A-4D and, therefore, may be may be embedded within and otherwise combined with the binder material 324 (FIGS. 4A-4D) to form a portion of the hard composite portion 208 (FIG. 2). The illustrated reinforcing particles 502a-b provide examples of outer surface features 504 that may be characterized as integral structural characteristics of the core of the reinforcing particles 502a-b. Whether the outer surface features 504 form integral surface feature extensions or integral surface feature definitions, there may be no defined or clear interface (i.e., transition from one material or layer to the next) between the core and the outer surface features 504. It should be noted that the reinforcing particles 502a-d are merely illustrative examples of various types or configurations of reinforcing particles consistent with the principles of present disclosure and, therefore, should not be considered limiting to the present disclosure.

Figure 5A:
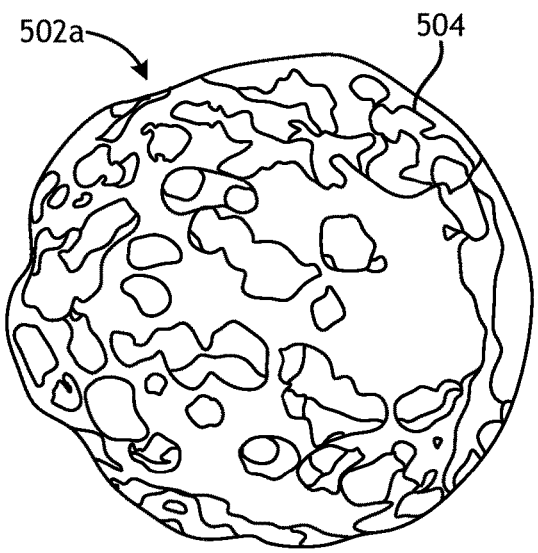
FIGS. 5A-5D are views of exemplary reinforcing particles that can incorporate the principles of the present disclosure.
Figure 5B:
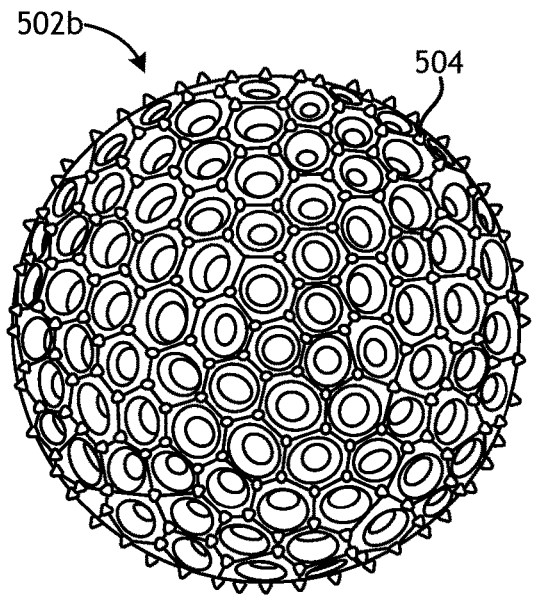

The reinforcing particles 502a-d may be fabricated and otherwise formed in a variety of ways, without departing from the scope of the disclosure. In FIGS. 5A and 5B, for example, fabrication of the reinforcing particles 502a and 502b may result in the formation of a porous or semi-porous outer surface feature 504. Such an outer surface feature 504 may result from an acidizing or etching treatment of the material of the reinforcing particles 502a,b. In such embodiments, for example, the reinforcing particles 502a,b may be submerged in or run through a reagent (e.g., an acid), such as an electrochemical bath, that corrodes or eats away the outer surface material of the reinforcing particles 502a,b at a known rate. The reagent may react with the material of the reinforcing particles 502a,b and etch high energy areas, thereby creating steps and valleys on the surface of the reinforcing particles 502a,b that may be characterized as porous or semi-porous outer surface features 504. In at least one embodiment, the acidizing treatment may be configured to proceed along grain boundaries of the material of the reinforcing particles 502a,b, and thereby result in the formation of the porous or semi-porous outer surface feature 504. More particularly, acids tend to attack areas of the material that are higher in free energy, and grain boundaries in the material have higher surface energies due to orientation mismatch between grains.

Suitable reagents or etching agents that may be used to generate the porous or semi-porous outer surface feature 504 include, but are not limited to, acids or bases that use sulfur (e.g., $H_2SO_3$, $H_2SO_4$, etc.), chlorine, carbon, phosphorus, fluorine, iodine, bromine, boron, nitrogen, chrome or manganese. The etchants may be used as a chemical bath or in an electrochemical cell and may be combined to differentially etch or corrode the outer surface feature 504.

Alternatively, the reinforcing particles 502a,b may be made of any base metal or base metal alloy that can form a ceramic (e.g., a carbide, a nitride, a boride, an oxide, a silicide) or an intermetallic upon being subjected to appropriate conditions, and then acidized or etched during a subsequent processing step to form the porous or semi-porous outer surface feature 504. Carbides may be formed by using aluminum, boron, calcium, cerium, chromium, erbium, iron, hafnium, lanthanum, lithium, magnesium, manganese, molybdenum, niobium, praseodymium, scandium, silicon, tantalum, titanium, vanadium, tungsten, yttrium, ytterbium, and zirconium. Nitrides may be formed by using aluminum, boron, calcium, cerium, cobalt, chromium, iron, gallium, hafnium, indium, lithium, magnesium, manganese, molybdenum, niobium, nickel, scandium, silicon, tantalum, titanium, vanadium, tungsten, yttrium, and zirconium. Borides may be formed by using aluminum, barium, beryllium, calcium, cerium, cobalt, chromium, dysprosium, erbium, europium, iron, gadolinium, hafnium, holmium, lanthanum, lithium, lutetium, magnesium, manganese, molybdenum, niobium, neodymium, nickel, osmium, palladium, praseodymium, platinum, rhenium, rhodium, ruthenium, scandium, samarium, strontium, tantalum, terbium, titanium, thulium, vanadium, tungsten, yttrium, ytterbium, and zirconium. Oxides may be formed by using aluminum, barium, beryllium, bismuth, calcium, cadmium, cerium, cobalt, chromium, cesium, copper, erbium, iron, gallium, germanium, hafnium, indium, potassium, lanthanum, lithium, magnesium, manganese, molybdenum, sodium, niobium, neodymium, nickel, lead, praseodymium, rubidium, antimony, scandium, silicon, tin, strontium, tantalum, terbium, tellurium, titanium, vanadium, tungsten, yttrium, zinc, and zirconium. Silicides may be formed by using barium, boron, calcium, cerium, cobalt, chromium, dysprosium, erbium, iron, gadolinium, hafnium, holmium, iridium, lanthanum, lithium, lutetium, magnesium, manganese, molybdenum, niobium, neodymium, nickel, osmium, palladium, praseodymium, platinum, rhenium, rhodium, ruthenium, scandium, samarium, strontium, tantalum, terbium, tellurium, titanium, thulium, vanadium, tungsten, yttrium, ytterbium, and zirconium.

Intermetallics are generally classified in two groups: stoichiometric and non-stoichiometric. Stoichiometric intermetallics, such as $Al_3Ni$, have a fixed composition (e.g., a vertical line on a phase diagram) and, similar to ceramic materials, are generally very hard, strong, and brittle. Non-stoichiometric intermetallics, such as AlNi, occur over a range of compositions and are generally more ductile than stoichiometric intermetallics. As a result, non-stoichiometric intermetallics provide intermediate properties between those of ceramics and stoichiometric intermetallics and those of pure metals and solid-solution alloys. More particularly, stoichiometric intermetallic structures provide enhanced stiffness and strength, similar to ceramics, whereas non-stoichiometric intermetallic structures provide intermediate reinforcing properties (e.g., still stiffer than binder or alloy materials, but with some ductility compared to ceramic and stoichiometric intermetallic materials).

Intermetallics (both stoichiometric and non-stoichiometric) may be formed by using at least two metallic elements that form intermetallic compounds. In addition to the ceramic materials already listed herein, examples of elements that form refractory aluminum-based intermetallics include cobalt, chromium, copper, iron, hafnium, iridium, manganese, molybdenum, niobium, nickel, palladium, platinum, rhenium, ruthenium, scandium, tantalum, titanium, vanadium, tungsten, and zirconium. Other examples of refractory intermetallic systems include silver-titanium, silver-zirconium, gold-hafnium, gold-manganese, gold-niobium, gold-scandium, gold-tantalum, gold-titanium, gold-thulium, gold-vanadium, gold-zirconium, beryllium-copper, beryllium-iron, beryllium-niobium, beryllium-nickel, beryllium-palladium, beryllium-titanium, beryllium-vanadium, beryllium-tungsten, beryllium-zirconium, any combination thereof, and the like. This skilled in the art will readily appreciate that the principles of the present disclosure can apply to several other potential intermetallics not listed herein, without departing from the scope of the disclosure.

Suitable base metals that may be used to form the reinforcing particles 502a,b and subsequently form a ceramic (e.g., a carbide, a nitride, a boride, an oxide, a silicide) or an intermetallic include, but are not limited to, any element from any of the foregoing lists. Suitable base metal alloys that may be used to form the reinforcing particles 502a,b and subsequently form a ceramic or an intermetallic include, but are not limited to, any alloy wherein the most prevalent element, when measured by weight, is from one of the foregoing lists.

The reinforcing particles 502a,b may be subjected to a diffusion-based process to convert at least a portion of the reinforcing particles 502a,b to a ceramic or an intermetallic. Suitable diffusion-based processes include, but are not limited to, carburizing, nitriding, boriding, and oxidizing, all of which may convert the reinforcing particles 502a,b, at least in part (e.g., along the surface), into a desired ceramic or intermetallic composition. During the diffusion-based process, some or all of the reinforcing particles 502a,b may be subjected to a reaction atmosphere comprising any capable media that may result in the production of a ceramic (e.g., an oxide, a carbide, a boride, a nitride, a silicide) or an intermetallic material (e.g., AlNi, TiAl). Suitable media includes, but is not limited to, methane, air, oxygen, endo-gas, exogas, nitrogen, ammonia, charcoal, carbon, graphite, nitriding salts, boron, silicon, vaporized metal (i.e., gas), molten metal, or any combination thereof.

The diffusion-based process may be conducted at an elevated temperature within a furnace, for example. The furnace used to conduct the diffusion-based process may comprise a continuous or batch furnace capable of operating with the desired media of the reaction atmosphere. Suitable furnaces include, but are not limited to, a belt furnace, a vacuum furnace, a muffle furnace, a retort furnace, any combination thereof, and the like.

In some embodiments, the diffusion-based process may incorporate the use of a liquid-metal bath. More particularly, the liquid-metal bath may be useful in reacting constituents together to create the ceramic or intermetallic. In such embodiments, the reinforcing particles 502a,b may be immersed in a liquid-metal bath to create the ceramic or intermetallic. As an example, in an embodiment where the reinforcing particles 502a,b is manufactured from a nickel-based metal, the nickel-based workpiece may be immersed in an aluminum bath to produce an intermetallic, such as $AlNi_3$, AlNi, $Al_3Ni_2$, or $Al_3Ni$.

Following the generation of the ceramic or intermetallic reinforcing particles 502a,b, the reinforcing particles 502a,b may subsequently be acidized or etched during a subsequent processing step to form the porous or semi-porous or interlocking outer surface feature 504. As the formation of the ceramic or intermetallic reinforcing particles 502a,b may have been partially completed, and thereby retaining the original composition, morphology, etc. of the particle core, the transformed outer ceramic or intermetallic features or material may be preferentially acidized or etched to retain the original particle core.

In some embodiments, any of the reinforcing particles 502a-d may be fabricated using an additive manufacturing process (e.g., 3D printing). Suitable additive manufacturing processes include, but are not limited to, laser sintering (LS) [e.g., selective laser sintering (SLS), direct metal laser sintering (DMLS)], laser melting (LM) [e.g., selective laser melting (SLM), lasercusing], electron-beam melting (EBM), laser metal deposition [e.g., direct metal deposition (DMD), laser engineered net shaping (LENS), directed light fabrication (DLF), direct laser deposition (DLD), direct laser fabrication (DLF), laser rapid forming (LRF), laser melting deposition (LMD)], any combination thereof, and the like.

Figure 5C:
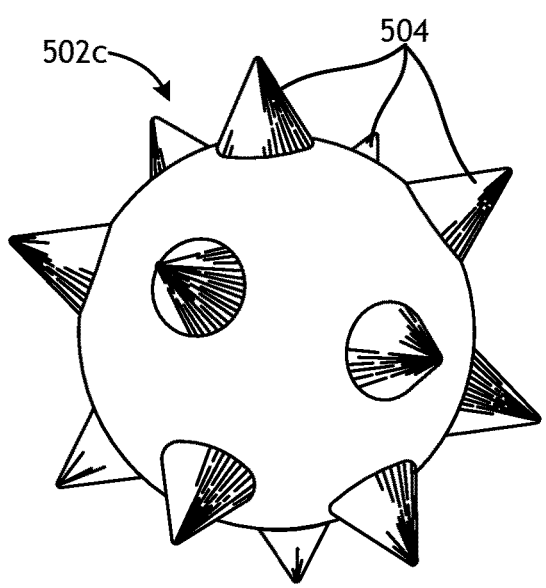

The reinforcing particle 502a-d may be printed to any desired shape, configuration, design, or size to correspond to specific or desired outer surface features 504. In FIG. 5C, for example, the outer surface features 504 of the reinforcing particle 502c comprise conical protrusions. In other embodiments, the outer surface features 504 may comprise other positive surface features, such as polygonal protrusions, crystalline (i.e., polyhedral) protrusions, finger-like protrusions, radiator fins, castellations, jigsaw puzzle nubs, ribs, fins, knobs, hooks, hitches, mesas, cylinders, cones, truncated cones, truncated cones on top of cylindrical bases, cones extending from cylindrical bases, two or more stacked cylinders of decreasing diameter, flanges, I-beam portions, bolt shapes with a tapered or flat head, any combination thereof, and the like. Alternatively, the outer surface features 504 may comprise negative surface features, such as cracks, seams, or grooves, as shown in the reinforcing particle 502d of FIG. 5D. Additional potential outer surface features 504 include pockets, pits, holes, knurling, channels, I-beam-shaped channels, or bolt-shaped channels. In yet other embodiments, the outer surface features 504 may comprise both positive and negative surface features, such as the nubs and holes shown in the reinforcing particle 502b of FIG. 5B. Those skilled in the art will readily appreciate that additive manufacturing may allow an operator to print the reinforcing particles 502a-d with almost infinite design configurations for the outer surface features 504, without departing from the scope of the disclosure.

In some embodiments, a three-dimensional metallic reinforcing particle 502a-d may be printed using an additive manufacturing process, and the metallic reinforcing particle 502a-d may subsequently be subjected to a diffusion-based process to convert at least a portion of the metallic reinforcing particle 502a-d to a ceramic or intermetallic material. The diffusion-based process may comprise any of the diffusion processes described or mentioned herein.

Figure 5D:
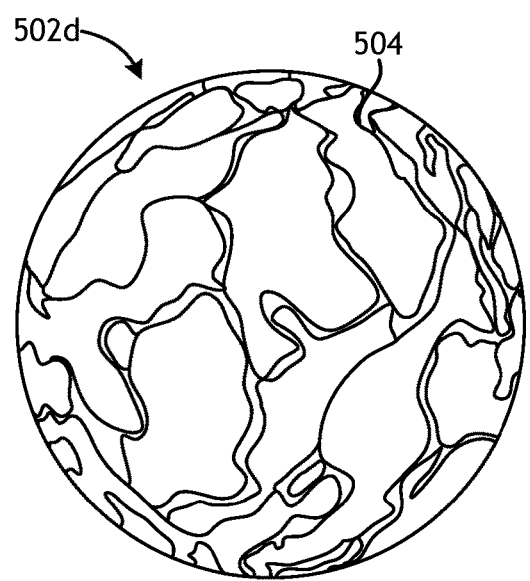

In some embodiments, such as shown in FIG. 5D, the outer surface features 504 may comprise negative features, such as cracks or grooves. While such features may be obtained or otherwise generated via additive manufacturing, as indicated above, they may alternatively be obtained by appropriately treating the outer surface of the reinforcing particle 502d. More particularly, in such embodiments, the outer surface of the reinforcing particle 502d may be coated or treated in an appropriate environment (similar to carburizing) such that the treatment media diffuses into and otherwise reacts with the material on the outer surface of the reinforcing particle 502d to form a different compound with a different coefficient of thermal expansion (CTE).

Forming the different compound on the outer surface of the reinforcing particle 502d may encourage the formation of cracks, voids, pores, etc. on the outer surface. Alternatively, such negative outer surface features 504 may be obtained by subjecting the reinforcing particle 502d to a thermal process, such as quenching heated particles in a suitable medium, such as water or oil, which will tend to crack the outer surfaces of the reinforcing particle 502d. Such processes may be limited to the outer surface of the reinforcing particle 502d by controlling appropriate process parameters (e.g., time, temperature, etc.).

In some embodiments, the reinforcing particles 502a-d may be fabricated, printed, or otherwise formed with the desired outer surface features 504 and then subsequently crushed. Crushing the reinforcing particles 502a-d may result in the formation of smaller particles that may resemble hemispheres, octants, steradians, and the like that exhibit the desired irregular outer surface features 504 on one or more sides but not on all sides. In such cases, resulting particle portions will retain the interlocking outer shell or layer on at least one side while also retaining the increased erosion resistance associated with solid edges or surfaces on at least one other side.

In some embodiments, the reinforcing particles 502a-d may be obtained from a larger structure, such as a plate or other three-dimensional structure. A plate, for example, may be fabricated, printed, or otherwise formed with the desired outer surface features 504 and then subsequently crushed to form a plurality of reinforcing particles 502a-d. Depending on how the plate shears, the resulting reinforcing particles 502a-d could be cube-shaped or crystalline, and could exhibit benefits similar to the crushed particles described above.

In some embodiments, the reinforcing particles 502a-d may be coupled to a secondary material to exhibit a desired material property, such as magnetism. Magnetizing the reinforcing particles 502a-d may prove advantageous in being able to segregate the reinforcing particles 502a-d into localized regions on the resulting MMC tool. More particularly, during the fabrication process of the MMC tool, magnets or magnetic fields may be used to selectively locate the magnetized reinforcing particles 502a-d along key areas of the mold (e.g., the mold assembly 300 of FIG. 3) for forming the MMC tool, such as along select regions of its internal surfaces. The empty interior region of the mold may then be backfilled with typical reinforcement materials 318 (FIG. 3) or an alternate material to provide toughness that keeps the magnetized reinforcing particles 502a-d in place for the subsequent infiltration process. After complete loading, the magnets or magnetic fields may be removed from the mold. The magnetic field can be produced by any known method, such as physical magnets (e.g., iron, rare-earth) or electrical coils (to produce induced magnetic fields). Examples of magnetic materials (including ferromagnets and ferrimagnets) that could be coupled to magnetize the reinforcing particles 502a-d include, but are not limited to, Co, CoFe, Fe, $Fe_2B$, SmCo, $Ni_3Fe$, $Fe_2O_3$, $NiFe_2O_4$, $Fe_3O_4$, $ZnFe_2O_4$, $Ni_3Mn$, $Fe_3Al$, $CuFe_2O_4$, $MgFe_2O_4$, $FePd_3$, $CoFe_2O_4$, MnBi, $Cu_2MnAl$, Ni, $Fe_3S_4$, $Fe_7S_8$, MnSb, $CrPt_3$, MnB, $MnFe_2O_4$, $Y_3Fe_5O_{12}$, $Cu_2MnIn$, $CrO_2$, $ZnCMn_3$, $MnPt_3$, MnAs, Gd, $AlCMn_3$, Tb, $Au_2MnAl$, Dy, EuO, TbN, $Au_4V$, $CrBr_3$, DyN, Tm, Ho, EuS, Er, $Sc_3In$, $GdCl_3$, any alloy thereof, and any combination thereof. Additional examples of alloy systems are ferritic steels, carbon steel, maraging steel, stainless steel, alloyed steel, tool steel, Fe—P, Fe—Si, Fe—Si—Al, Ni—Fe, Fe—Ni—Mo, Fe—Cr, Fe—Co, Fe—Nd—B, Ni—Al—Cu, Co—Ni—Al—Cu, Co—Ni—Al—Cu—Ti, Co—Sm, spinel ferrites (e.g., $Mn_{0.5}Zn_{0.5}Fe_2O_4$, $Ni_{0.3}Zn_{0.7}Fe_2O_4$), and rare-earth iron garnets.

Figure 6:
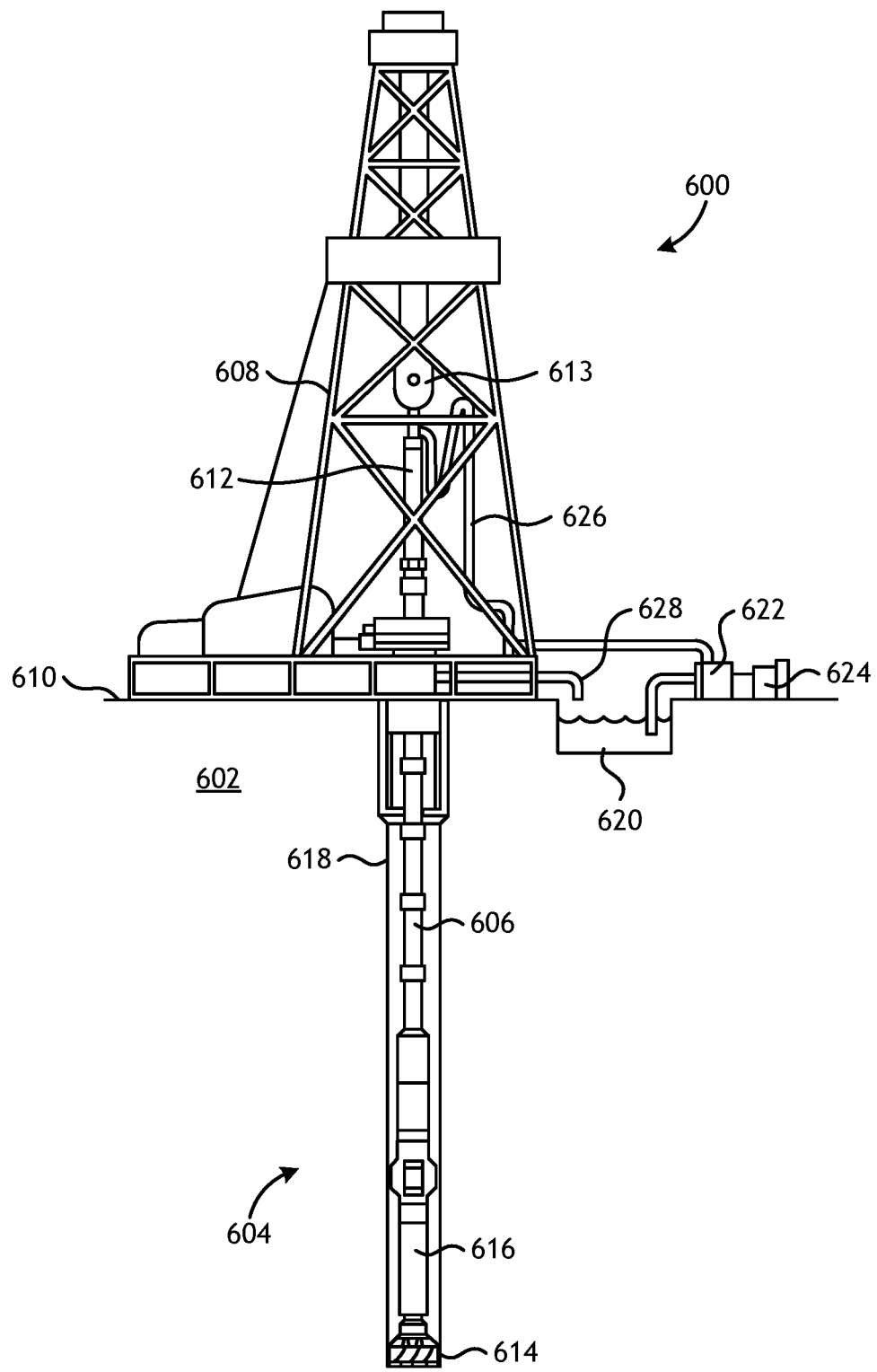
FIG. 6 is a schematic drawing showing a drilling assembly suitable for using a matrix drill bit in accordance with the present disclosure.

FIG. 6, illustrated is an exemplary drilling system 600 that may employ one or more principles of the present disclosure. Boreholes may be created by drilling into the earth 602 using the drilling system 600. The drilling system 600 may be configured to drive a bottom hole assembly (BHA) 604 positioned or otherwise arranged at the bottom of a drill string 606 extended into the earth 602 from a derrick 608 arranged at the surface 610. The derrick 608 includes a kelly 612 and a traveling block 613 used to lower and raise the kelly 612 and the drill string 606.

The BHA 604 may include a drill bit 614 operatively coupled to a tool string 616 which may be moved axially within a drilled wellbore 618 as attached to the drill string 606. The drill bit 614 may be fabricated and otherwise created in accordance with the principles of the present disclosure and, more particularly, with reinforcing particles that have irregular outer surface features. During operation, the drill bit 614 penetrates the earth 602 and thereby creates the wellbore 618. The BHA 604 provides directional control of the drill bit 614 as it advances into the earth 602. The tool string 616 can be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within the tool string 616, as shown in FIG. 6.

Fluid or "mud" from a mud tank 620 may be pumped downhole using a mud pump 622 powered by an adjacent power source, such as a prime mover or motor 624. The mud may be pumped from the mud tank 620, through a stand pipe 626, which feeds the mud into the drill string 606 and conveys the same to the drill bit 614. The mud exits one or more nozzles arranged in the drill bit 614 and in the process cools the drill bit 614. After exiting the drill bit 614, the mud circulates back to the surface 610 via the annulus defined between the wellbore 618 and the drill string 606, and in the process, returns drill cuttings and debris to the surface. The cuttings and mud mixture are passed through a flow line 628 and are processed such that a cleaned mud is returned down hole through the stand pipe 626 once again.

Although the drilling system 600 is shown and described with respect to a rotary drill system in FIG. 6, those skilled in the art will readily appreciate that many types of drilling systems can be employed in carrying out embodiments of the disclosure. For instance, drills and drill rigs used in embodiments of the disclosure may be used onshore (as depicted in FIG. 6) or offshore (not shown). Offshore oil rigs that may be used in accordance with embodiments of the disclosure include, for example, floaters, fixed platforms, gravity-based structures, drill ships, semi-submersible platforms, jack-up drilling rigs, tension-leg platforms, and the like. It will be appreciated that embodiments of the disclosure can be applied to rigs ranging anywhere from small in size and portable, to bulky and permanent.

Further, although described herein with respect to oil drilling, various embodiments of the disclosure may be used in many other applications. For example, disclosed methods can be used in drilling for mineral exploration, environmental investigation, natural gas extraction, underground installation, mining operations, water wells, geothermal wells, and the like. Further, embodiments of the disclosure may be used in weight-on-packers assemblies, in running liner hangers, in running completion strings, etc., without departing from the scope of the disclosure.

Embodiments disclosed herein include:

A. A metal matrix composite (MMC) tool that includes a hard composite portion that includes reinforcing particles dispersed in a binder material, wherein at least some of the reinforcing particles comprise a monolithic particle structure including a core having irregular outer surface features integral with the core and that mechanically interlock with the binder material.

B. A drill bit that includes a bit body, and a plurality of cutting elements coupled to an exterior of the bit body, wherein at least a portion of the bit body comprises a hard composite portion that includes reinforcing particles dispersed in a binder material, wherein at least some of the reinforcing particles comprise a monolithic particle structure including a core having irregular outer surface features integral with the core and that mechanically interlock with the binder material.

C. A drilling assembly that includes a drill string extendable from a drilling platform and into a wellbore, a drill bit attached to an end of the drill string, and a pump fluidly connected to the drill string and configured to circulate a drilling fluid to the drill bit and through the wellbore, wherein the drill bit comprises a bit body, and a plurality of cutting elements coupled to an exterior of the bit body, wherein at least a portion of the bit body comprises a hard composite portion that includes reinforcing particles dispersed in a binder material, wherein at least some of the reinforcing particles comprise a monolithic particle structure including a core having irregular outer surface features integral with the core and that mechanically interlock with the binder material.

Each of embodiments A, B, and C may have one or more of the following additional elements in any combination: Element 1: wherein the irregular outer surface features comprise positive outer surface features that extend outward from the core. Element 2: wherein the irregular outer surface features comprise negative outer surface features that extend inward into the core or are defined on the core. Element 3: wherein the core is a solid structure. Element 4: wherein the core is porous or semi-porous. Element 5: wherein the at least some of the reinforcing particles exhibit a cross-sectional shape selected from the group consisting of circular, an ovoid, ovular, ellipse, triangle, square, rectangle, parallelogram, trapezoid, quadrilateral, pentagon, hexagon, octagon, regular polygonal, irregular polygon, or any combination thereof, with sharp, rounded, or chamfered vertices, and any combination thereof. Element 6: wherein the irregular outer surface features comprise a porous or semi-porous outer surface feature resulting from an etching treatment. Element 7: wherein some or all of the at least some of the reinforcing particles are subjected to a diffusion-based process that converts at least a portion of each reinforcing particle to a ceramic or an intermetallic. Element 8: wherein some or all of the at least some of the reinforcing particles are printed via an additive manufacturing process. Element 9: wherein the some or all of the at least some of the reinforcing particles are printed and subsequently subjected to a diffusion-based process that converts at least a portion of each reinforcing particle to a ceramic or an intermetallic. Element 10: wherein some or all of the at least some of the reinforcing particles are treated such that an outer surface of each reinforcing particle exhibits a coefficient of thermal expansion different from the core, and wherein the irregular outer surface features are negative features formed as a result of a coefficient of thermal expansion mismatch between the core and the outer surface. Element 11: wherein the negative features are formed following subjecting the some or all of the at least some of the reinforcing particles to a thermal process. Element 12: wherein some or all of the at least some of the reinforcing particles are formed from a larger three-dimensional structure that is crushed to form the some or all of the at least some of the reinforcing particles. Element 13: wherein the irregular outer surface features comprise at least one of positive surface features that extend outward from the core and negative outer surface features that extend inward into the core or are defined on the core. Element 14: wherein the irregular outer surface features comprise a porous or semi-porous outer surface feature resulting from an etching treatment. Element 15: wherein some or all of the at least some of the reinforcing particles are printed via an additive manufacturing process. Element 16: wherein some or all of the at least some of the reinforcing particles are treated such that an outer surface of each reinforcing particle exhibits a coefficient of thermal expansion different from the core, and wherein the irregular outer surface features are negative features formed as a result of a coefficient of thermal expansion mismatch between the core and the outer surface.

By way of non-limiting example, exemplary combinations applicable to A, B, and C include: Element 6 with Element 7; Element 8 with Element 9; and Element 10 with Element 11.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A metal matrix composite (MMC) tool for use in a wellbore, comprising:
    a bit body capable of being used in a wellbore, having a hard composite portion that includes reinforcing particles dispersed in a binder material, wherein at least some of the reinforcing particles comprise a monolithic particle structure including a core having irregular outer surface features integral with the core, the irregular outer surface features interlocked with neighboring reinforcing particles.

2. The MMC tool of claim 1, wherein the irregular outer surface features comprise positive outer surface features that extend outward from the core.

3. The MMC tool of claim 1, wherein the irregular outer surface features comprise negative outer surface features that extend inward into the core or are defined on the core.

4. The MMC tool of claim 1, wherein the core is a solid structure.

5. The MMC tool of claim 1, wherein the at least some of the reinforcing particles exhibit a cross-sectional shape selected from the group consisting of circular, an ovoid, ovular, ellipse, triangle, square, rectangle, parallelogram, trapezoid, quadrilateral, pentagon, hexagon, octagon, regular polygonal, irregular polygon, or any combination thereof, with sharp, rounded, or chamfered vertices, and any combination thereof.

6. The MMC tool of claim 1, wherein the porous outer surface feature results from an etching treatment.

7. The MMC tool of claim 6, wherein some or all of the at least some of the reinforcing particles are subjected to a diffusion-based process that converts at least a portion of each reinforcing particle to a ceramic or an intermetallic.

8. The MMC tool of claim 1, wherein some or all of the at least some of the reinforcing particles are printed via an additive manufacturing process.

9. The MMC tool of claim 8, wherein the some or all of the at least some of the reinforcing particles are printed and subsequently subjected to a diffusion-based process that converts at least a portion of each reinforcing particle to a ceramic or an intermetallic.

10. The MMC tool of claim 1, wherein some or all of the at least some of the reinforcing particles are treated such that an outer surface of each reinforcing particle exhibits a coefficient of thermal expansion different from the core, and wherein the irregular outer surface features are negative features formed as a result of a coefficient of thermal expansion mismatch between the core and the outer surface.

11. The MMC tool of claim 10, wherein the negative features are formed following subjecting the some or all of the at least some of the reinforcing particles to a thermal process.

12. The MMC tool of claim 1, wherein some or all of the at least some of the reinforcing particles are formed from a larger three-dimensional structure that is crushed to form the some or all of the at least some of the reinforcing particles.

13. The MMC tool of claim 1, wherein the porous outer surface features mechanically interlock with the binder material.

* * * * *